(12) United States Patent
Kawabata et al.

(10) Patent No.: US 6,316,083 B1
(45) Date of Patent: Nov. 13, 2001

(54) WET TYPE FRICTION MATERIAL

(75) Inventors: Masataka Kawabata, Toyota; Atsushi Suzuki, Okazaki, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/328,790

(22) Filed: Jun. 9, 1999

(30) Foreign Application Priority Data

| Jun. 12, 1998 | (JP) | 10-165422 |
| Sep. 16, 1998 | (JP) | 10-261906 |
| Nov. 24, 1998 | (JP) | 10-333177 |

(51) Int. Cl.$^7$ ............................... B23B 7/02
(52) U.S. Cl. ............ 428/212; 428/293.4; 428/297.4; 428/688
(58) Field of Search ............... 428/212, 293.4, 428/297.4, 688

(56) References Cited

U.S. PATENT DOCUMENTS

| 5,433,774 | * | 7/1995 | Kapl et al. ......................... 106/36 |
| 5,834,511 | * | 11/1998 | Haraguchi et al. ................. 524/492 |
| 5,962,135 | * | 10/1999 | Walker et al. ..................... 428/408 |

FOREIGN PATENT DOCUMENTS

| 60-106687 | * | 5/1986 | (JP) . |
| 7-21298 | | 3/1995 | (JP) . |
| 7-292348 | | 11/1995 | (JP) . |
| 10-46499 | | 2/1998 | (JP) . |

* cited by examiner

*Primary Examiner*—Bruce H. Hess
*Assistant Examiner*—B. Shewareged
(74) *Attorney, Agent, or Firm*—Burns, Doane, Swecker & Mathis, LLP

(57) ABSTRACT

A wet type friction material of a layered construction is disclosed, in which at least two layers are laminated, one of the two layers being a friction-surface layer disposed on a friction-surface side, the other one thereof being a base layer disposed on a fixed side, wherein the entire friction material exhibiting a Young's modulus of Et, the base layer exhibiting a Young's modulus of Eb, and the Et and the Eb satisfying a relationship of Eb/Et<1. When the friction material slides on a mating member, it is good in the ability of following the mating member because the base layer exhibits the low Young's modulus Eb. As a result, it is possible to secure a large contact area with respect to the mating member. At the same time, it is possible to secure a high friction coefficient because the friction-surface layer exhibiting a high Young's modulus Et contacts with the mating member.

14 Claims, 3 Drawing Sheets

WET TYPE FRICTION MATERIAL

BACKGROUND OF THE INVENTION

1. Field of the Invention

The present invention relates to a wet type friction material which is used in a clutch facing of a power transmission system of an automobile, an industrial machine, a railroad vehicle, etc., and which is used in an oil.

2. Description of the Related Art

Concerning friction materials for wet type clutch facings, a variety of chartaceous friction materials have been used widely. A chartaceous friction material comprises a substrate and a binder which is impregnated into and cured in the substrate. The substrate is formed of organic fibers and a several types of friction conditioners admixed with the organic fibers. The binder is composed of a thermosetting resin, such as a phenolic resin, etc.

However, the aforementioned friction material has a problem in that it exhibits not only a low heat resistance but also a low friction coefficient. Accordingly, a variety of countermeasures are taken to solve the problem.

Regarding one of the countermeasures, a number of friction plates is increased to enlarge the contact area with respect to a mating member, for instance, in a field of clutch facings. However, the construction of the wet type clutch is not only complicated but also large-sized by adopting such a countermeasure. Accordingly, the counter measure results in a large energy loss and a high cost.

Moreover, a trial has been carried out in which a copper-based sintered friction material is applied to a wet type clutch. If such a sintered friction material can be utilized, even when the number of friction plates is less and the contact area is small, the wet type clutch can satisfy the heat resistance and the strength against pressure. Consequently, the aforementioned problem can be solved. However, many of the sintered-metal-based friction materials exhibit a friction coefficient lower than organic friction materials in most of the cases. Hence, as a wet type clutch for a recent high-performance automobile, the sintered-metal-based friction materials cannot necessarily exhibit satisfactory friction characteristics.

Japanese Examined Patent Publication (KOKOKU) No. 7-021,298 discloses a two-layered wet type friction material which comprises a friction-surface side and a fixed-surface side. The friction-surface side includes a chartaceous substrate into which a thermosetting resin is impregnated. The chartaceous substrate is prepared by a papermaking machine with fibrous components, inorganic fillers and friction conditioners in a wet manner. The fixed-surface side includes a chartaceous substrate into which a thermosetting resin is impregnated. The chartaceous substrate is prepared by a papermaking machine with fibrous components in a wet manner. However, in the friction material, the fixed-surface side contributes only to improving the cooling ability and the mechanical strength, but little affects the friction characteristics. The friction characteristics depend on the friction-surface side itself. The friction-surface side exhibits a friction coefficient which is equivalent to those general wet type friction materials.

SUMMARY OF THE INVENTION

The present invention has been developed in view of the aforementioned circumstances. It is therefore an object of the present invention to provide a novel chartaceous friction material which can securely exhibit a much higher friction coefficient and an upgraded heat resistance.

A wet type friction material according to the present invention carries out the aforementioned object. A first aspect of the present friction material is a wet type friction material of a layered construction, in which at least two layers are laminated, one of the two layers being a friction-surface layer disposed on a friction-surface side, the other one thereof being a base layer disposed on a fixed side, wherein the entire friction material exhibiting a Young's modulus of $E_t$, the base layer exhibiting a Young's modulus of $E_b$, and the $E_t$ and the $E_b$ satisfying a relationship of $E_b/E_t<1$ (i.e., a ratio of $E_b$ with respect to $E_t$ is less than 1).

A second aspect of the present wet type friction material is characterized in that each of the friction-surface layer and the base-surface layer of the first aspect of the present wet type friction material includes an organic-and-inorganic composite binder which is prepared by drying and burning a sol solution, the sol solution being prepared by hydrolyzing at least one member selected from the group consisting of a metallic alkoxide and a metallic alkoxide substituted by an organic group.

A third aspect of the present wet type friction material is characterized in that the friction-surface layer of the first aspect of the present wet type friction material includes a composite filler which is made by entangling a fibrous material around a filler powder.

A fourth aspect of the present wet type friction material is characterized in that the friction-surface layer of the first aspect of the present wet type friction material includes a porous filler which is composed of a porous inorganic compound.

A fifth aspect of the present wet type friction material is characterized in that the friction-surface layer of the first aspect of the present wet type friction material includes a composite filler which is prepared by entangling a fibrous material around a porous filler being composed of a porous inorganic compound.

A sixth aspect of the present wet type friction material is characterized in that the friction-surface layer of the second aspect of the present wet type friction material includes diatomaceous earth.

A seventh aspect of the present wet type friction material is characterized in that the friction-surface layer of the second aspect of the present wet type friction material includes graphite.

In the first aspect of the present wet type friction material, the Young's modulus $E_t$ of the entire friction material and the Young's modulus $E_b$ of the base layer satisfies the relationship of $E_b/E_t<1$. Accordingly, the Young's modulus $E_b$ of the base layer is lower than the Young's modulus $E_t$ of the entire friction material. Thus, when the present friction material slides on the mating member, it is good in the ability of following the mating member because the base layer exhibits the low Young's modulus $E_b$. As a result, it is possible to secure a large contact area with respect to the mating member.

Moreover, since the friction-surface layer exhibits a high Young's modulus, it is possible to secure a high friction coefficient. Thus, in accordance with the present wet type friction material, it is possible to secure a remarkably high friction coefficient by the synergetic effect of the action of the base layer and the action of the friction-surface layer. When the $E_b/E_t$ is 1 or more, the base layer is too hard to exhibit the high ability of following the mating member. Consequently, the contact area decreases so that the friction coefficient decreases. It is especially preferred that the $E_b/E_t$ satisfies the relationship of $E_b/E_t<0.7$. If such is the case, the base layer exhibits the ability of following the mating member extremely well.

The lower limit of the Eb/Et is not limited in particular. However, the Eb/Et preferably satisfies the inequality, 0.01 <Eb/Et (i.e., a ratio of Eb with respect to Et is less than 0.01), further preferably, the inequality, 0.1 <Eb/Et. When the Eb/Et is 0.01 or less, the friction-surface layer is too hard to exhibit an ability of following the mating member. Consequently, the contact area decreases so that the friction coefficient decreases.

Concerning the characteristics of friction materials, it is preferred that they maintain a high friction coefficient over a wide range of sliding speeds. For example, when the ratio between a first friction coefficient which is exhibited by a friction material at a sliding speed of 0.5 m/s and a second friction coefficient which is exhibited by the same at a sliding speed of 0.05 m/s is as close as 1, it is said that the friction material is superb. Moreover, when the ratio (i.e., (the first friction coefficient at the sliding speed of 0.5 m/s)/(the second friction at the sliding speed of 0.05 m/s), hereinafter referred to as a "$\mu$-V gradient") is 1, the friction material exhibits flat friction characteristics. When the $\mu$-V gradient is more than 1, the friction material exhibits positive-gradient friction characteristics. When the $\mu$-V gradient is less than 1, the friction material exhibits negative-gradient friction characteristics. In addition, it is preferred that the dynamic friction coefficients of friction materials are higher than the static friction coefficients of the same. Accordingly, it is preferred that the faster the sliding speed is; the higher friction coefficients the friction materials exhibit. Therefore, the present wet type friction material can preferably exhibit the $\mu$-V gradient of 1 or more as well.

According to the results of the experiments conducted by the inventors of the present invention, the $\mu$-V gradient is less than 1.0 when the Eb/Et exceeds 0.7. Consequently, it is especially preferred that the Eb/Et satisfies the inequality, Eb/Et<0.7.

The thickness ratio of the friction-surface layer with respect to the entire thickness of the present friction material can preferably satisfy the relationship, (the thickness of the friction-surface layer)/(the entire thickness of the present friction material)≦$\frac{1}{10}$. When the thickness of the friction-surface layer is too large to satisfy the relationship, the aforementioned action resulting from the base layer of low Young's modulus is impaired to lower the ability of following the mating member. Accordingly, the contact area decreases so that the friction coefficient decreases.

Each of the friction-surface layer and the base layer can include a substrate, a filler, and a binder. As for the substrate, a fibrous material or an elastic material can be used. The fibrous material can be a paper-like, cloth-like or non-woven fibrous material. The elastic material can be rubber, elastomer or resin.

The fibrous material constituting the substrate can be at least one member selected from the group consisting of an inorganic fiber and an organic fiber. The inorganic fiber can be at least one member selected from the group consisting of a glass fiber, rock wool, a potassium titanate fiber, a ceramics fiber, a silica fiber, a silica-alumina fiber, a kaoline fiber, a bauxite fiber, a novoloid fiber, a cayanoid fiber, a boron fiber, a magnesia fiber and a metallic fiber. The organic fiber can be at least one member selected from the group of a linters pulp, a wood pulp, a synthetic pulp, a polyester-based fiber, a polyamide-based fiber, a polyimide-based fiber a polyvinyl alcohol modified fiber, a polyvinyl chloride fiber a polypropylene fiber, a polybenzimidazole fiber, an acrylic fiber, a carbon fiber, a phenolic fiber, a nylon fiber and a cellulose fiber.

In the case of the chartaceous substrate, it is manufactured by a papermaking machine with the fibrous material. The rubber, elastomer or resin, constituting the substrate, can be, for example, a nitrile rubber, an acrylic rubber, an acrylonitrile-butadiene rubber, a styrene-butadiene rubber, a silicone rubber, a fluororubber, a polyamide resin, a polyacrylic resin, a polyester resin, a phenolic resin, a cellulose resin, a polyimide resin, a polyvinyl alcohol resin, a polyvinyl chloride resin, a polypropylene resin and a polybenzimidazole resin. A plurality of these materials can be combined to use. Moreover, in order to control the Young's modulus, these materials can be foamed, or the density of the substrate can be varied locally. In addition, when the substrate is used in a clutch facing which is used in an oil, the rubber, elastomer or resin can preferably exhibit an oil resistance.

As for the binder, a thermosetting resin, such as a phenolic resin, which has been used conventionally can be used. However, as set forth in the second aspect of the present wet type friction material, it is preferred to use the organic-and-inorganic composite binder which is prepared by drying and burning a sol solution, the sol solution being prepared by hydrolyzing at least one member selected from the group consisting of a metallic alkoxide and a metallic alkoxide substituted by an organic group. With this arrangement, the present wet type friction material can exhibit a further enhanced friction coefficient.

This organic-and-inorganic composite binder can be impregnated into the chartaceous substrate by carrying out the following steps. First of all, in a first step, a sol solution is prepared by hydrolyzing at least one member selected from the group consisting of a metallic alkoxide and a metallic alkoxide substituted by an organic group. As for the metallic alkoxide, the alkoxides of silicon, aluminum, zirconium and titanium can be employed. As for the metallic alkoxide substituted by an organic group, these alkoxide can be employed in which an alkyl group substitutes for a part of the alkoxyl group.

It is preferred that the metallic alkoxide and the metallic alkoxide substituted by an organic group are used simultaneously. The weight ratio of the metallic alkoxide with respect to the metallic alkoxide substituted by an organic group can preferably fall in the range of from 3:7 to 0:10 (i.e., the metallic alkoxide:the metallic alkoxide substituted by an organic group=3:7 to 0:10). When the amount of the metallic alkoxide is greater than the ratio, the flexibility of the resulting friction material decreases so that the friction coefficient is decreased by the reduction of the contact area.

In the first step, it is further preferred that the sol solution can preferably further include a silicone resin which involve an organic group in the siloxane skeleton. With this arrangement, since a soft silicone resin constitutes a part of the resulting binder for the present friction material, the flexibility of the resulting present friction material is improved so that the friction coefficient can be furthermore heightened.

The first step can be carried out by adding water to an alcohol solution which contains at least one member selected from the group consisting of a metallic alkoxide and a metallic alkoxide substituted by an organic group, thereby generating a sol solution containing hydroxide. In the first step, it is preferred to enhance the reactivity of the hydrolysis by adding an acid or alkali, or by heating.

In the second step, the sol solution prepared in the first step is impregnated into a chartaceous substrate which is made from a fibrous material. Thus, an impregnated substrate is prepared in which the sol solution containing metallic hydroxide is impregnated among the fibers. Note that, when the fillers are included, they can be mixed in the sol solution which is prepared in the first step, or they can be mixed with a fibrous material to form a chartaceous substrate so that they are included in the substrate. In a certain case, the fillers can be adhered on the substrate by sprinkling them on the surface of the substrate after the sol solution is impregnated into the substrate.

Finally, in the third step, the sol containing hydroxide is turned into a sol containing oxide by drying and burning the impregnated substrate, thereby firmly fastening the fibers in the substrate. When the metallic alkoxide substituted by an organic group is employed in a large amount in the first step, the organic group is oriented so that it is in the proximity of the organic fibers of the substrate. Thus, the metallic alkoxide and the metallic alkoxide substituted by an organic group can bind further firmly with the organic fibers so that the resulting present friction material exhibits a further upgraded strength. Moreover, there arises another benefit in that the resulting present friction material exhibits a higher friction coefficient because the organic group enhances the flexibility.

It is preferred that the burning of the third step can preferably be carried at a temperature of from 150 to 300° C. for from 0.5 to 1.0 hour. When the burning temperature is lower than the lower limit, or when the burning time is shorter than the lower limit, it is difficult to generate the sol containing oxide. Accordingly, the resulting friction material cannot exhibit a sufficient strength. When the burning temperature is higher than the upper limit, or when the burning time is longer than the upper limit, the organic compounds decompose to deteriorate the friction characteristics of the resulting friction material.

It is also preferred to carry out the third step in an atmosphere containing ammonium. With this arrangement, it is considered that the metallic elements included in the sol are nitrided partially. Thus, the resulting present friction material exhibits a much higher friction coefficient. When the atmosphere contains ammonium in a trace amount, the benefits can be obtained. However, the benefits can be obtained maximally when the atmosphere contains ammonium in an amount of 10% by volume approximately.

It is preferred that the third step is carried out under an ultra critical condition. The ultra critical condition herein means a condition under which the organic substances included in the substrate and the sol are immediately before the vaporization. Under the condition, the molecular movements are extremely active. The temperature at which the ultra critical condition is established can be heightened by pressurizing, and thereby the molecular movements are furthermore active. Hence, it is preferred to carry out the third step under a high-temperature-and-high-pressure condition. Thus, by establishing the high-temperature-and-high-pressure ultra critical condition, the reactivity of burning can be upgraded while inhibiting the organic substances from decomposing, and accordingly the un-reacted portions are suppressed to reside in the resulting present friction material. As a result, it is possible to stably manufacture the present friction material which exhibits a high friction coefficient.

As for the filler, it is possible to use at least one member, which is selected from the group consisting of barium sulfate, calcium carbonate, magnesium carbonate, silicon carbide, boron carbide, titanium carbide, silicon nitride, born nitride, alumina, silica, zirconia, cashew dust, rubber dust, diatomaceous earth, graphite, talc, kaoline, magnesium oxide, molybdenum disulfide, a nitrile rubber, an acrylonitrile-butadiene rubber, a styrene-butadiene rubber, a silicone rubber and a fluororubber, in an appropriate amount.

When the particle diameter of the filler exceeds 50 μm, the irregularity of the surface of the resulting friction material enlarges so that the total contact area with respect to the mating member decreases. Consequently, the particle diameter can preferably be 50 μm or less.

Moreover, when the filler is included in the friction material, the resulting a friction material exhibits a high Young's modulus. Accordingly, in order to establish the relationship, Eb/Et<1, the base layer can preferably be free from the filler, and only the friction-surface layer can preferably include the filler.

In addition, as set forth in the third aspect of the present friction material, the friction-surface layer can preferably include a composite filler which is made by entangling a fibrous material around a filler powder. With this arrangement, the resulting present friction material exhibits a further increased boundary friction coefficient. At the same time, the filler is inhibited from scattering. Thus, the present friction material exhibits a furthermore improved durability.

The composite filler can be formed by entangling a fibrous material around an inorganic filler or a friction-modifier powder. The fibrous material can be an acrylic fiber, a cellulose fiber or an aromatic polyamide fiber, for example. The inorganic filler can be barium sulfate, calcium carbonate, magnesium carbonate, silicon carbide, boron carbide, titanium carbide, silicon nitride, boron nitride, alumina, silica and zirconia. The friction-modifier powder can be cashew dust, rubber dust, diatomaceous earth, graphite, talc, kaoline, magnesium oxide, molybdenum disulfide, a nitrile rubber, an acrylonitrile-butadiene rubber, a styrene-butadiene rubber, a silicone rubber and a fluororubber.

Similarly to the filler which is free from the entangled fibrous material, the inorganic filler or the friction-modifier powder employed herein and included in the composite filler can preferably have a particle diameter of 50 μm or less.

The composite filler can preferably be included in the friction-surface layer in an amount of from 30 to 90% by weight. When the composite filler is included therein in an amount of less than the lower limit, the benefits resulting from the inclusion cannot be obtained. When the composite filler is included therein in an amount of more than the upper limit, the composite filler wears off in a shorter period of time.

The composite filler can preferably include the fibrous material in an amount of from 0.5 to 50% by weight and the filler powder in an amount of from 50 to 99.5%. When the composite filler includes the fibrous material in an amount of more than the upper limit, it is difficult for the resulting friction material to exhibit a high friction coefficient. When the composite filler includes the fibrous material in an amount of less than the lower limit, the filler might scatter while the resulting friction material frictionally slides on the mating member.

When preparing the composite filler, it is preferred to employ a fibrillated fiber in order to enhance the binding force between the filler powder and the fibrous material. The fibrillated fiber herein means a fiber which is fibrillated in a wet manner preparation by using a papermaking machine.

As set forth in the fourth aspect of the present friction material, the friction-surface layer can preferably include a porous filler which is composed of a porous inorganic compound. When the present friction material is put into service, an oil and polymer components included in the oil are adsorbed on the porous filler, and the viscosity of the adsorbates increases the shearing resistance exerted between the present friction material and the mating member. Moreover, the porous inorganic compounds effect the abrasive action as well. These actions further decrease the Eb/Et. Consequently, it is furthermore easy to secure an ability of following the mating member and a large contact area. Thus, the present friction material exhibits a furthermore increased friction coefficient.

As for the porous inorganic compound, any porous substance can be employed. For example, alumina, silica, zirconia, titania, silica-alumina or zeolite can be employed. Among them, it is especially appropriate to employ zeolite which has uniform pores.

When the zeolite was employed as the porous inorganic compound, the inventors of the present invention found that the friction coefficient of the present friction material is hardly varied but is stabilized even when the sliding speed is varied in the frictional engagement of the present friction material with a mating member. When the present friction material with the thus stabilized friction coefficient is used as a clutch facing in an automatic transmission of an automobile, the shock is reduced when accelerating or decelerating the automobile. Thus, a benefit is effected in that the riding comfort is upgraded.

Similarly to the particle diameters of the other fillers, the particle diameter of the porous filler can preferably be 50 μm or less.

When the zeolite is used as the porous inorganic compound, it is preferred that the zeolite has a pore diameter of from 3 to 13 Å. It is further preferred that the zeolite has a pore diameter of from 5 to 13 Å. When the zeolite is employed which has a pore diameter falling in the range, the adsorbability of the zeolite is enhanced especially to the polymer components included in the oil. Thus, the present friction material exhibits a furthermore increased friction coefficient. Moreover, the zeolite can preferably exhibit the $SiO_2/Al_2O_3$ molar ratio of from 1 to 2,000, further preferably exhibit the $SiO_2/Al_2O_3$ molar ratio of from 30 to 500. When the zeolite which exhibits the $SiO_2/Al_2O_3$ molar ratio falling in the range, the present friction material exhibit an optimum abrasive action. Accordingly, while inhibiting the wear of the mating member, the present friction material can exhibit a furthermore increased friction coefficient.

The porous filler can preferably be included in the friction-surface layer in an amount of from 30 to 90% by weight. When the porous filler is included therein in an amount of less than the lower limit, the benefits resulting from the inclusion cannot be obtained. When the porous filler is included therein in an amount of more than the upper limit, the porous filler wears off in a shorter period of time.

As set forth in the fifth aspect of the present friction material, the porous filler can be made into a composite filler which is prepared by entangling a fibrous material around the porous filler, and can be included in the friction-surface layer. With this arrangement, the present friction material can stably maintain a high friction coefficient for a much longer period of time, and can be of further superb durability. The composite filler can be formed by entangling short fibers of a fibrous material around a powder of the aforementioned porous fillers. The fibrous material can be an acrylic fiber, a cellulose fiber and an aromatic polyamide fiber. Similarly to the porous filler which is free from the entangled fibrous material, the powder of the porous fillers to be made into in the composite filler can preferably have a particle diameter of 50 μm or less.

The composite filler can preferably be included in the friction-surface layer in an amount of from 30 to 90% by weight. When the composite filler is included therein in an amount of less than the lower limit, the benefits resulting from the inclusion cannot be obtained. When the composite filler is included therein in an amount of more than the upper limit, the composite filler wears off in a shorter period of time.

The composite filler can preferably include the fibrous material in an amount of from 0.5 to 50% by weight and the porous filler powder in an amount of from 50 to 99.5%. When the composite filler includes the fibrous material in an amount of more than the upper limit, it is difficult for the resulting friction material to exhibit a high friction coefficient. When the composite filler includes the fibrous material in an amount of less than the lower limit, the porous filler might scatter while the resulting friction material frictionally slides on the mating member.

When preparing the composite filler, it is preferred to employ a fibrillated fiber in order to enhance the binding force between the porous filler powder and the fibrous material. The fibrillated fiber herein means a fiber which is fibrillated in a wet manner preparation by using a paper-making machine.

In the present friction material including the aforementioned organic-and-inorganic composite filler, diatomaceous earth can be further included as the other filler to be included in the friction-surface layer. The diatomaceous earth is earth which is formed by depositing the shells of diatoms, and includes silica in an amount of about 94%. Moreover, the diatomaceous earth is a porous substance whose porosity is from 70 to 90%. In addition, the diatomaceous earth has characteristics in that it exhibits a low thermal conductivity, it is less likely to be damaged by acids and it has a high heat resistance. It is believed that the diatomaceous earth combines with the composite binder to form a hard composite material on the friction-surface layer. Because of the abrasive action of the hard composite material, the present friction material exhibits a much higher friction coefficient.

The diatomaceous earth can preferably be included in the friction-surface layer in an amount of from 30 to 90% by weight. When the diatomaceous earth is included therein in an amount of less than the lower limit, the benefits resulting from the inclusion cannot be obtained. When the diatomaceous filler is included therein in an amount of more than the upper limit, the diatomaceous filler wears off in a shorter period of time.

Similarly to the porous filler such as the zeolite, etc., the diatomaceous earth can be made into a composite filler which is prepared by entangling a fibrous material around a powder of the diatomaceous earth, and can be included in the friction-surface layer. With this arrangement, the present friction material can stably maintain a high friction coefficient for a much longer period of time, and can be of further superb durability. The composite filler can be formed by entangling short fibers of a fibrous material around a powder of the diatomaceous earth. The fibrous material can be an acrylic fiber, a cellulose fiber and an aramid fiber.

The composite filler can preferably be included in the friction-surface layer in an amount of from 30 to 90% by weight. When the composite filler is included therein in an amount of less than the lower limit, the benefits resulting from the inclusion cannot be obtained. When the composite filler is included therein in an amount of more than the upper limit, the composite filler wears off in a shorter period of time.

The composite filler can preferably include the fibrous material in an amount of from 0.5 to 50% by weight and the diatomaceous earth powder in an amount of from 50 to 99.5%. When the composite filler includes the fibrous material in an amount of more than the upper limit, it is difficult for the resulting friction material to exhibit a high friction coefficient. When the composite filler includes the fibrous material in an amount of less than the lower limit, the diatomaceous earth might scatter while the resulting friction material frictionally slides on the mating member.

When preparing the composite filler, it is preferred to employ a fibrillated fiber in order to enhance the binding force between the diatomaceous earth powder and the fibrous material. The fibrillated fiber herein means a fiber which is fibrillated in a wet manner preparation by using a papermaking machine.

In the present friction material including the aforementioned organic-and-inorganic composite filler, graphite can be further included as the other filler.

The graphite is composed of carbon crystals. Accordingly, the graphite has characteristics in that it is flexible, it exhibits a high sliding ability, it is stable chemically, it exhibits a high thermal conductivity and it has a high heat resistance. It is believed that the graphite combines with the composite filler to form a hard composite material on the friction-surface layer. Because of the abrasive action of the hard composite material, the present friction material exhibits a much higher friction coefficient.

The graphite can preferably be included in the friction-surface layer in an amount of from 30 to 90% by weight. When the graphite is included therein in an amount of less than the lower limit, the benefits resulting from the inclusion cannot be obtained. When the graphite is included therein in an amount of more than the upper limit, the graphite wears off in a shorter period of time.

Similarly to the porous filler such as the zeolite, etc., the graphite can be made into a composite filler which is prepared by entangling a fibrous material around a powder of the graphite, and can be included in the friction-surface layer. With this arrangement, the present friction material can stably maintain a high friction coefficient for a much longer period of time, and can be of further superb durability. The composite filler can be formed by entangling short fibers of a fibrous material around a powder of the graphite. The fibrous material can be an acrylic fiber, a cellulose fiber and an aramid fiber.

The composite filler can preferably be included in the friction-surface layer in an amount of from 30 to 90% by weight. When the composite filler is included therein in an amount of less than the lower limit, the benefits resulting from the inclusion cannot be obtained. When the composite filler is included therein in an amount of more than the upper limit, the composite filler wears off in a shorter period of time.

The composite filler can preferably include the fibrous material in an amount of from 0.5 to 50% by weight and the graphite powder in an amount of from 50 to 99.5%. When the composite filler includes the fibrous material in an amount of more than the upper limit, it is difficult for the resulting friction material to exhibit a high friction coefficient. When the composite filler includes the fibrous material in an amount of less than the lower limit, the graphite might scatter while the resulting friction material frictionally slides on the mating member.

When preparing the composite filler, it is preferred to employ a fibrillated fiber in order to enhance the binding force between the graphite powder and the fibrous material. The fibrillated fiber herein means a fiber which is fibrillated in a wet manner preparation by using a papermaking machine.

When manufacturing the present wet type friction material, water suspensions of the raw materials of the base layer and the raw materials of the friction-surface layer are prepared, respectively. One of the water suspensions are flowed over a Fourdrinier machine to deposit the raw materials thereon. In the middle of removing the water, the other one of the water suspensions is flowed over the deposit. Then, after removing the water, the resulting deposit is pressed and dried to prepare a paper-like web. A binder, such as a phenolic resin, is impregnated into the paper-like web, and is heated to cure. Thus, the present wet type friction material can be manufactured.

When the organic-and-inorganic composite binder is employed, the sol solution is impregnated into the paper-like web. The sol solution is prepared by hydrolyzing at least one member selected from the group consisting of a metallic alkoxide and a metallic alkoxide substituted by an organic group. Then, the impregnated paper-like web is dried and burned. Thus, the present wet type friction material can be manufactured.

Moreover, when the composite filler is employed in the friction-surface layer, the composite filler can be prepared in advance. Alternatively, a fibrous component, a fibril fiber and a filler powder or a porous filler powder, for instance, can be employed as the raw materials which constitute the friction-surface layer. With this arrangement, the fibril fiber is fibrillated in a preparation by using a papermaking machine. Thus, the fibrillated fiber entangle around the filler powder or the porous filler powder to form the composite filler.

Note that the present wet type friction material can have two layers, the base layer and the friction-surface layer, at least. The other layers may be interposed between the two layers. In addition, the base layer or the friction-surface layer can be made into a functionally gradient layer which exhibits a Young's modulus increasing gradually from the fixed surface side to the friction-surface layer side.

As described so far, in accordance with the first aspect of the present wet type friction material, the base layer of the low Young's modulus improves the ability of following the mating member, and increases the contact area. At the same time, the friction-surface layer of the high Young's modulus contacts with the mating member to remarkably raise the friction coefficient. When the relationship, Eb/Et<0.7, is established, the $\mu$-V gradient is 1 or more. As a result, the present wet type friction material exhibits further favorable friction characteristics.

In accordance with the second aspect of the present wet type friction material, the friction coefficient exhibited by the same is furthermore increased.

In accordance with the third aspect of the present wet type friction material, the durability of the same is furthermore upgraded.

In accordance with the fourth or fifth aspect of the present wet type friction material, the present wet type friction material exhibits a high friction coefficient when it frictionally engages with the mating member at a high sliding speed. Hence, regardless of the sliding-speed variation, it is possible to stably obtain a high friction coefficient.

In accordance with the sixth or seventh aspect of the present wet type friction material, the friction-surface layer includes the optimum filler when the organic-and-inorganic composite binder is employed. Hence, the present wet type friction material exhibits a high friction coefficient and a furthermore upgraded durability.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

The present invention will be hereinafter described in detail with reference to specific examples.

EXAMPLE No. 1

Figure 1:
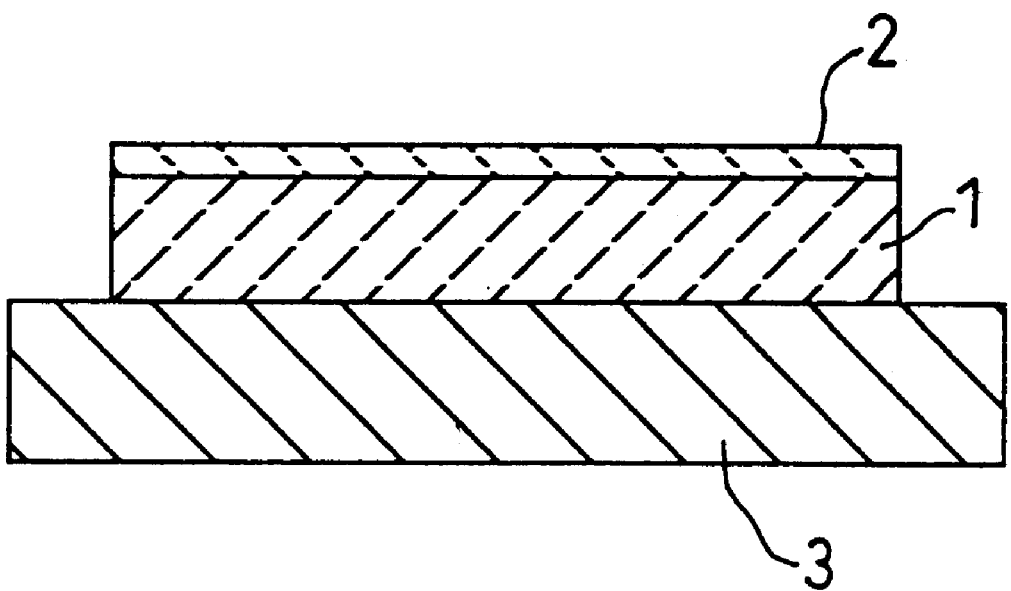
FIG. 1 is a cross-sectional view for illustrating a wet type friction material, an example according to the present invention, which is joined to a core plate.

FIG. 1 illustrates a rough cross-section of a wet type friction material of Example No. 1. The friction material comprises a base layer 1 and a friction-surface layer 2 laminated on a surface of the base layer 1. A core plate 3 is joined to the rear surface of the base layer 1.

The base layer 1 was composed of a first chartaceous substrate. The first chartaceous substrate included a cellulose fiber in an amount of 80 parts by weight and an aromatic polyamide fiber (hereinafter referred to as an "aramid fiber") in an amount of 10 parts by weight. Whilst, the friction-surface layer 2 was composed of a second chartaceous substrate. The second chartaceous substrate included a cellulose fiber in an amount of 80 parts by weight, an aramid fiber in an amount of 10 parts by weight, and cashew dust in an amount of 100 parts by weight. Then, a phenolic resin was impregnated into the base layer 1 and the friction-surface layer 2 in an amount of 30 parts by weight with respect to the whole first and second chartaceous substrates taken as 100 parts by weight.

The thickness of the base layer 1 was 0.9 mm. The thickness of the friction-surface layer 2 was 0.1 mm. The base layer 1 exhibited a Young's modulus Eb of 50 MPa. The entire friction material exhibited a Young's modulus Et of 75 MPa. Thus, the Eb/Et was 0.667 (i.e., Eb/Et=0.667).

The manufacturing process of the friction material will be hereinafter described in place of the detailed description of the arrangement of the same.

A first water dispersion was prepared for the base layer 1. In the first water dispersion, 80 parts by weight of the cellulose fiber and 10 parts by weight of the aramid fiber were mixed. A second water dispersion was prepared for the friction-surface layer 2. In the second water dispersion, 80 parts by weight of the cellulose fiber, 10 parts by weight of the aramid fiber, and 100 parts by weight of the cashew dust were mixed.

Then, a Fourdrinier machine was used. On the endless wire screen, the first water suspension was flowed out to remove the water. Thus, a precursor base layer was formed. In the middle of the water removal, the second water suspension was flowed out over the precursor base layer to remove the water. Consequently, a two-layered precursor chartaceous substrate, which included the precursor base layer and a precursor friction-surface layer, was prepared by using the papermaking machine.

Note that the thicknesses of the precursor base layer and the precursor friction-surface layer were controlled by adjusting the concentrations of the raw materials in the first and second water dispersions, respectively.

The precursor chartaceous substrate, which was thus prepared by using the papermaking machine, was compressed with two rollers, and was dried by a drying roller to prepare a chartaceous substrate. Then, the chartaceous substrate was cut to a predetermined shape, and was impregnated with 30 parts by weight of the phenolic resin. After drying, the impregnated chartaceous substrate was heated to cure. Thus, a friction material of Example No. 1 was completed.

Figure 2:
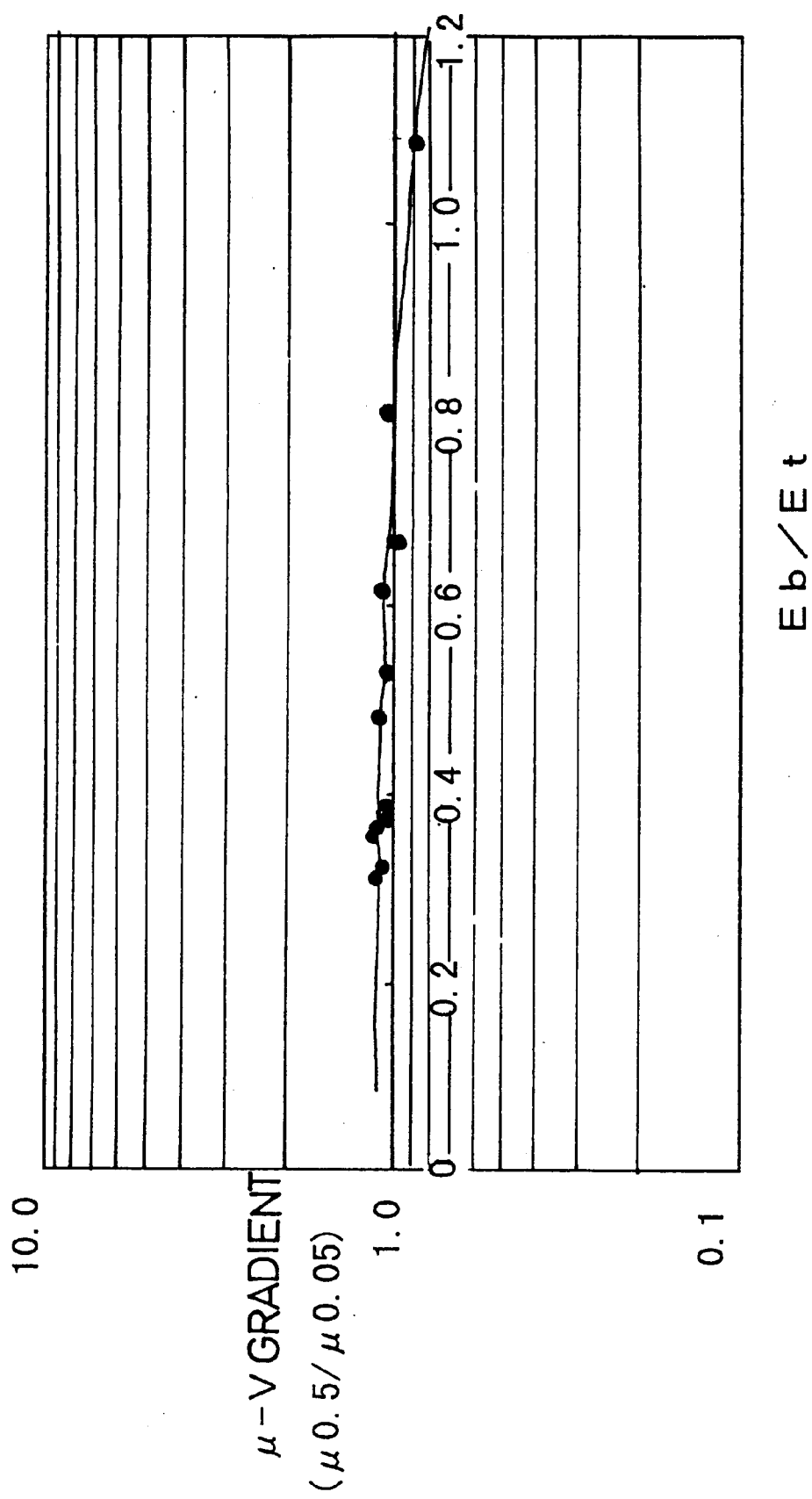
FIG. 2 is a graph for illustrating the relationship between the Eb/Et and the $\mu$-V gradient.

The resulting friction material was examined for a first friction coefficient by using an SAE #2 wear tester under the conditions set forth in Table 1 below. Moreover, by operating the same SAE #2 wear tester under the conditions set forth in Table 2 below, the friction material was examined for the durability, for instance, a first number of cycles at which the friction coefficient was reduced by 10% from the initial stable state or a second number of cycles at which the friction material suffered from peeling off. In addition, by operating the same SAE #2 wear tester under the conditions set forth in Table 3 below, the friction material was examined for the other two friction coefficients, for example, a second friction coefficient at the sliding speed of 0.05 m/s and a third friction coefficient at the sliding speed of 0.5 m/s. Then, the $\mu$-V gradient was determined. The results of the measurements are summarized in Table 4, and are illustrated in FIG. 2.

TABLE 1

No. of Friction-Surface Layers: 6
Inertia: 3.5 kg · cm · s$^2$
No. of Revolutions: 3,600 rpm
Oil Supply Amount: 700 c.c.
Oil Temp.: 100° C.
Load: 300 kgf

TABLE 2

No. of Friction-Surface Layers: 6
Inertia: 1.0 kg · cm · s$^2$
No. of Revolutions: 6,000 rpm
Oil Supply Amount: 300 c.c./min.
Oil Temp.: 100° C.
Load: 300 kgf

TABLE 3

No. of Friction-Surface Layers: 6
Sliding Speed: 0.05 m/s or 0.5 m/s
Oil Supply Amount: 700 c.c.
Oil Temp.: 100° C.
Load: 300 kgf

EXAMPLE No. 2

Except that the composition ratio of the raw materials was different from that of Example No. 1, a friction material of Example No. 2 was manufactured in the same manner as Example No. 1.

For instance, the base layer 1 was composed of a first chartaceous substrate. The first chartaceous substrate included a cellulose fiber in an amount of 10 parts by weight and an aramid fiber in an amount of 80 parts by weight. Whilst, the friction-surface layer 2 was composed of a second chartaceous substrate. The second chartaceous substrate included a cellulose fiber in an amount of 10 parts by weight, an aramid fiber in an amount of 80 parts by weight, and cashew dust in an amount of 100 parts by weight. Then, a phenolic resin was impregnated into the base layer 1 and the friction-surface layer 2 in an amount of 30 parts by weight with respect to the whole first and second chartaceous substrates taken as 100 parts by weight.

The thickness of the base layer 1 was 0.9 mm. The thickness of the friction-surface layer 2 was 0.1 mm. The base layer 1 exhibited a Young's modulus Eb of 45 MPa. The entire friction material exhibited a Young's modulus Et of 73 MPa. Thus, the Eb/Et was 0.616 (i.e., Eb/Et=0.616).

The friction material of Example No. 2 was examined for the characteristics in the same manner as Example No. 1. The results of the measurements are summarized in Table 4, and are illustrated in FIG. 2.

EXAMPLE No. 3

Except that the composition ratio of the raw materials was different from that of Example No. 1, a friction material of Example No. 3 was manufactured in the same manner as Example No. 1.

For instance, the base layer 1 was composed of a first chartaceous substrate. The first chartaceous substrate included a cellulose fiber in an amount of 10 parts by weight and an aramid fiber in an amount of 80 parts by weight. Whilst, the friction-surface layer 2 was composed of a second chartaceous substrate. The second chartaceous substrate included a cellulose fiber in an amount of 10 parts by weight, an aramid fiber in an amount of 80 parts by weight, and cashew dust in an amount of 200 parts by weight. Then, a phenolic resin was impregnated into the base layer 1 and the friction-surface layer 2 in an amount of 30 parts by weight with respect to the whole first and second chartaceous substrates taken as 100 parts by weight.

The thickness of the base layer 1 was 0.9 mm. The thickness of the friction-surface layer 2 was 0.1 mm. The base layer 1 exhibited a Young's modulus Eb of 45 MPa. The entire friction material exhibited a Young's modulus Et of 85 MPa. Thus, the Eb/Et was 0.529 (i.e., Eb/Et=0.529).

The friction material of Example No. 3 was examined for the characteristics in the same manner as Example No. 1. The results of the measurements are summarized in Table 4, and are illustrated in FIG. 2.

EXAMPLE No. 4

Except that the composition ratio of the raw materials was different from that of Example No. 1, a friction material of Example No. 4 was manufactured in the same manner as Example No. 1.

For instance, the base layer 1 was composed of a first chartaceous substrate. The first chartaceous substrate included a silicate glass fiber in an amount of 80 parts by weight. Whilst, the friction-surface layer 2 was composed of a second chartaceous substrate. The second chartaceous substrate included a silicate glass fiber in an amount of 80 parts by weight, and cashew dust in an amount of 100 parts by weight. Then, a phenolic resin was impregnated into the base layer 1 and the friction-surface layer 2 in an amount of 30 parts by weight with respect to the whole first and second chartaceous substrates taken as 100 parts by weight.

The thickness of the base layer 1 was 0.9 mm. The thickness of the friction-surface layer 2 was 0.1 mm. The base layer 1 exhibited a Young's modulus Eb of 40 MPa. The entire friction material exhibited a Young's modulus Et of 83 MPa. Thus, the Eb/Et was 0.482 (i.e., Eb/Et=0.482).

The friction material of Example No. 4 was examined for the characteristics in the same manner as Example No. 1. The results of the measurements are summarized in Table 4, and are illustrated in FIG. 2.

EXAMPLE No. 5

Except that the raw materials and the manufacturing processes were different from those of Example No. 1, a friction material of Example No. 5 was manufactured in the same manner as Example No. 1.

For instance, the base layer 1 was composed of a first chartaceous substrate. The first chartaceous substrate included a cellulose fiber in an amount of 80 parts by weight and an aramid fiber in an amount of 10 parts by weight. Whilst, the friction-surface layer 2 was composed of a second chartaceous substrate. The second chartaceous substrate included a cellulose fiber in an amount of 80 parts by weight, an aramid fiber in an amount of 10 parts by weight, and cashew dust in an amount of 100 parts by weight. Then, an organic-and-inorganic composite binder was impregnated into the base layer 1 and the friction-surface layer 2 in an amount of 30 parts by weight with respect to the whole first and second chartaceous substrates taken as 100 parts by weight.

The friction material of Example No. 5 was manufactured as hereinafter described.

A sol solution was prepared in the following manner: namely, 27.6 parts by weight of ethanol and 20.8 parts by weight of tetraethoxy silane ($Si(OC_2H_5)_4$) were weighed and put into a glass container, and were stirred for 10 minutes. Thereafter, while stirring the resulting solution, 0.05 N hydrochloric acid aqueous solution was dropped in the solution in an amount of 20 parts by weight. The solution was further stirred for 24 hours to prepare the sol solution.

Meanwhile, a chartaceous substrate was prepared in the same manner as Example No. 1. Then, the resulting chartaceous substrate was cut to a predetermined shape, and was impregnated with a predetermined amount of the above-described sol solution. After drying, the impregnated chartaceous substrate was heated to cure. Thus, the wet type friction material of Example No. 5 was completed.

The thickness of the base layer 1 was 0.9 mm. The thickness of the friction-surface layer 2 was 0.1 mm. The base layer 1 exhibited a Young's modulus Eb of 60 MPa. The entire friction material exhibited a Young's modulus Et of 160 MPa. Thus, the Eb/Et was 0.375 (i.e., Eb/Et=0.375).

The friction material of Example No. 5 was examined for the characteristics in the same manner as Example No. 1. The results of the measurements are summarized in Table 4, and are illustrated in FIG. 2.

EXAMPLE No. 6

Except that the composition ratio of the raw materials was different from that of Example No. 5, a friction material of Example No. 6 was manufactured in the same manner as Example No. 5.

For instance, the base layer 1 was composed of a first chartaceous substrate. The first chartaceous substrate included a cellulose fiber in an amount of 10 parts by weight and an aramid fiber in an amount of 80 parts by weight. Whilst, the friction-surface layer 2 was composed of a second chartaceous substrate. The second chartaceous substrate included a cellulose fiber in an amount of 10 parts by weight, an aramid fiber in an amount of 80 parts by weight, and cashew dust in an amount of 100 parts by weight. Then, the organic-and-inorganic composite binder was impregnated into the base layer 1 and the friction-surface layer 2 in an amount of 30 parts by weight with respect to the whole first and second chartaceous substrates taken as 100 parts by weight.

The friction material of Example No. 6 was thus manufactured in the same manner as Example No. 5. The thickness of the base layer 1 was 0.9 mm. The thickness of the friction-surface layer 2 was 0.1 mm. The base layer 1 exhibited a Young's modulus Eb of 55 MPa. The entire friction material exhibited a Young's modulus Et of 155 MPa. Thus, the Eb/Et was 0.355 (i.e., Eb/Et=0.355).

The friction material of Example No. 6 was examined for the characteristics in the same manner as Example No. 1. The results of the measurements are summarized in Table 4, and are illustrated in FIG. 2.

EXAMPLE No. 7

Except that the composition ratio of the raw materials was different from that of Example No. 5, a friction material of Example No. 7 was manufactured in the same manner as Example No. 5.

For instance, the base layer 1 was composed of a first chartaceous substrate. The first chartaceous substrate included a cellulose fiber in an amount of 10 parts by weight and an aramid fiber in an amount of 80 parts by weight. Whilst, the friction-surface layer 2 was composed of a second chartaceous substrate. The second chartaceous substrate included a cellulose fiber in an amount of 10 parts by weight, an aramid fiber in an amount of 80 parts by weight, and cashew dust in an amount of 200 parts by weight. Then, the organic-and-inorganic composite binder was impregnated into the base layer 1 and the friction-surface layer 2 in an amount of 30 parts by weight with respect to the whole first and second chartaceous substrates taken as 100 parts by weight.

The friction material of Example No. 7 was thus manufactured in the same manner as Example No. 5. The thickness of the base layer 1 was 0.9 mm. The thickness of the friction-surface layer 2 was 0.1 mm. The base layer 1 exhibited a Young's modulus Eb of 55 MPa. The entire friction material exhibited a Young's modulus Et of 175 MPa. Thus, the Eb/Et was 0.314 (i.e., Eb/Et=0.314).

The friction material of Example No. 7 was examined for the characteristics in the same manner as Example No. 1. The results of the measurements are summarized in Table 4, and are illustrated in FIG. 2.

EXAMPLE No. 8

Except that the composition ratio of the raw materials was different from that of Example No. 5, a friction material of Example No. 8 was manufactured in the same manner as Example No. 5.

For instance, the base layer 1 was composed of a first chartaceous substrate. The first chartaceous substrate included a cellulose fiber in an amount of 80 parts by weight, an aramid fiber in an amount of 10 parts by weight, and cashew dust in an amount of 10 parts by weight. Whilst, the friction-surface layer 2 was composed of a second chartaceous substrate. The second chartaceous substrate included a cellulose fiber in an amount of 80 parts by weight, an aramid fiber in an amount of 10 parts by weight, and cashew dust in an amount of 100 parts by weight. Then, the organic-and-inorganic composite binder was impregnated into the base layer 1 and the friction-surface layer 2 in an amount of 30 parts by weight with respect to the whole first and second chartaceous substrates taken as 100 parts by weight.

The friction material of Example No. 8 was thus manufactured in the same manner as Example No. 5. The thickness of the base layer 1 was 0.9 mm. The thickness of the friction-surface layer 2 was 0.1 mm. The base layer 1 exhibited a Young's modulus Eb of 120 MPa. The entire friction material exhibited a Young's modulus Et of 150 MPa. Thus, the Eb/Et was 0.800 (i.e., Eb/Et=0.800).

The friction material of Example No. 8 was examined for the characteristics in the same manner as Example No. 1. The results of the measurements are summarized in Table 4, and are illustrated in FIG. 2.

EXAMPLE No. 9

Except that the raw materials were different from that of Example No. 1, a friction material of Example No. 9 had the same arrangement as that of Example No. 1.

For instance, the base layer 1 was composed of a first chartaceous substrate. The first chartaceous substrate included a cellulose fiber in an amount of 80 parts by weight and an aramid fiber in an amount of 10 parts by weight.

Whilst, the friction-surface layer 2 was composed of a second chartaceous substrate. The second chartaceous substrate included a cellulose fiber in an amount of 80 parts by weight, an aramid fiber in an amount of 10 parts by weight, and a composite filler in an amount of 110 parts by weight. The composite filler included an aramid fiber in an amount of 10 parts by weight and cashew dust in an amount of 100 parts by weight. Then, an organic-and-inorganic composite binder was impregnated into the base layer 1 and the friction-surface layer 2 in an amount of 27 parts by weight with respect to the whole first and second chartaceous substrates taken as 100 parts by weight.

The friction material of Example No. 9 was manufactured as hereinafter described.

A first water dispersion was prepared for the base layer 1. In the first water dispersion, 80 parts by weight of the cellulose fiber and 10 parts by weight of the aramid fiber were mixed. A second water dispersion was prepared for the friction-surface layer 2. In the second water dispersion, 10 parts by weight of the aramid fiber and 100 parts by weight of the cashew dust were mixed.

Then, a Fourdrinier machine was used. On the endless wire screen, the first water dispersion was flowed out to remove the water. Thus, a precursor base layer was formed. In the middle of the water removal, the second water dispersion was flowed out over the precursor base layer to remove the water. Consequently, a two-layered precursor chartaceous substrate, which included the precursor base layer and a precursor friction-surface layer, was prepared by using the papermaking machine.

Note that the thicknesses of the precursor base layer and the precursor friction-surface layer were controlled by adjusting the concentrations of the raw materials in the first and second water dispersions, respectively. Also note that, in the preparation using the papermaking machine, the aramid fiber entangled around the cashew dust to form the composite filler.

The precursor chartaceous substrate, which was thus prepared by using the papermaking machine, was compressed with two rollers, and was dried by a drying roller to prepare a chartaceous substrate. Then, the chartaceous substrate was impregnated with the organic-and-inorganic composite binder in the same manner as Example No. 5. After drying and burning, the impregnated chartaceous substrate was cut to a predetermined shape. Thus, a friction material of Example No. 9 was completed.

The thickness of the base layer 1 was 0.9 mm. The thickness of the friction-surface layer 2 was 0.1 mm. The base layer 1 exhibited a Younges modulus Eb of 60 MPa. The entire friction material exhibited a Young's modulus Et of 155 MPa. Thus, the Eb/Et was 0.387 (i.e., Eb/Et=0.387).

The friction material of Example No. 9 was examined for the characteristics in the same manner as Example No. 1. The results of the measurements are summarized in Table 4, and are illustrated in FIG. 2.

EXAMPLE No. 10

Except that the composition ratio of the raw materials was different from that of Example No. 9, a friction material of Example No. 10 was manufactured in the same manner as Example No. 9.

For instance, the base layer 1 was composed of a first chartaceous substrate. The first chartaceous substrate included a cellulose fiber in an amount of 10 parts by weight and an aramid fiber in an amount of 80 parts by weight. Whilst, the friction-surface layer 2 was composed of a second chartaceous substrate. The second chartaceous substrate included a cellulose fiber in an amount of 10 parts by weight, an aramid fiber in an amount of 80 parts by weight, and a composite filler in an amount of 110 parts by weight. The composite filler included an aramid fiber in an amount of 10 parts by weight and cashew dust in an amount of 100 parts by weight. Then, the organic-and-inorganic composite binder was impregnated into the base layer 1 and the friction-surface layer 2 in an amount of 27 parts by weight with respect to the whole first and second chartaceous substrates taken as 100 parts by weight.

The friction material of Example No. 10 was thus manufactured in the same manner as Example No. 9. The thickness of the base layer 1 was 0.9 mm. The thickness of the friction-surface layer 2 was 0.1 mm. The base layer 1 exhibited a Young's modulus Eb of 55 MPa. The entire friction material exhibited a Young's modulus Et of 150 MPa. Thus, the Eb/Et was 0.367 (i.e., Eb/Et=0.367).

The friction material of Example No. 10 was examined for the characteristics in the same manner as Example No. 1. The results of the measurements are summarized in Table 4, and are illustrated in FIG. 2.

EXAMPLE No. 11

Except that the composition ratio of the raw materials was different from that of Example No. 9, a friction material of Example No. 11 was manufactured in the same manner as Example No. 9.

For instance, the base layer 1 was composed of a first chartaceous substrate. The first chartaceous substrate included a cellulose fiber in an amount of 10 parts by weight and an aramid fiber in an amount of 80 parts by weight. Whilst, the friction-surface layer 2 was composed of a second chartaceous substrate. The second chartaceous substrate included a cellulose fiber in an amount of 10 parts by weight, an aramid fiber in an amount of 80 parts by weight, and a composite filler in an amount of 210 parts by weight. The composite filler included an aramid fiber in an amount of 10 parts by weight and cashew dust in an amount of 200 parts by weight. Then, the organic-and-inorganic composite binder was impregnated into the base layer 1 and the friction-surface layer 2 in an amount of 27 parts by weight with respect to the whole first and second chartaceous substrates taken as 100 parts by weight.

The friction material of Example No. 11 was thus manufactured in the same manner as Example No. 9. The thickness of the base layer 1 was 0.9 mm. The thickness of the friction-surface layer 2 was 0.1 mm. The base layer 1 exhibited a Young's modulus Eb of 55 MPa. The entire friction material exhibited a Young's modulus Et of 170 MPa. Thus, the Eb/Et was 0.324 (i.e., Eb/Et=0.324).

The friction material of Example No. 11 was examined for the characteristics in the same manner as Example No. 1. The results of the measurements are summarized in Table 4, and are illustrated in FIG. 2.

EXAMPLE No. 12

In Example No. 12, the base layer 1 was composed of a first chartaceous substrate. The first chartaceous substrate included a cellulose fiber in an amount of 80 parts by weight and an aramid fiber in an amount of 10 parts by weight. Whilst, the friction-surface layer 2 was composed of a second chartaceous substrate. The second chartaceous substrate included a cellulose fiber in an amount of 80 parts by weight, an aramid fiber in an amount of 10 parts by weight, and zeolite in an amount of 100 parts by weight. For example, the zeolite is "HSZ690HOA" produced by Tosoh Co., Ltd., and exhibited an average particle diameter of 15 $\mu$m, a pore diameter of 7 Å and an $SiO_2$-to-$Al_2O_3$ molar ratio of 222 (i.e., $SiO_2/Al_2O_3$=222). Then, an organic-and-inorganic composite binder was impregnated into the base layer 1 and the friction-surface layer 2 in an amount of 30 parts by weight with respect to the whole first and second chartaceous substrates taken as 100 parts by weight.

The friction material of Example No. 12 was manufactured as hereinafter described.

A sol solution was prepared in the following manner: namely, 27.6 parts by weight of ethanol and 20.8 parts by weight of tetraethoxy silane ($Si(OC_2H_5)_4$) were weighed and put into a glass container, and were stirred for 10 minutes. Thereafter, while stirring the resulting solution, 0.05 N hydrochloric acid aqueous solution was dropped in the solution in an amount of 20 parts by weight. The solution was further stirred for 24 hours to prepare the sol solution.

Meanwhile, a chartaceous substrate was prepared in the same manner as Example No. 1. Then, the resulting chartaceous substrate was cut to a predetermined shape, and was impregnated with a predetermined amount of the above-described sol solution. After drying, the impregnated chartaceous substrate was heated to cure. Thus, the wet type friction material of Example No. 12 was completed.

The thickness of the base layer 1 was 0.9 mm. The thickness of the friction-surface layer 2 was 0.1 mm. The base layer 1 exhibited a Young's modulus Eb of 60 MPa. The entire friction material exhibited a Young's modulus Et of 140 MPa. Thus, the Eb/Et was 0.429 (i.e., Eb/Et=0.429).

The friction material of Example No. 12 was examined for the characteristics in the same manner as Example No. 1. The results of the measurements are summarized in Table 5.

EXAMPLE No. 13

Except that the composition ratio of the raw materials was different from that of Example No. 12, a friction material of Example No. 13 was manufactured in the same manner as Example No. 12.

For instance, the base layer 1 was composed of a first chartaceous substrate. The first chartaceous substrate included a cellulose fiber in an amount of 10 parts by weight and an aramid fiber in an amount of 80 parts by weight. Whilst, the friction-surface layer 2 was composed of a second chartaceous substrate. The second chartaceous substrate included a cellulose fiber in an amount of 10 parts by weight, an aramid fiber in an amount of 80 parts by weight, and zeolite in an amount of 100 parts by weight. Then, the organic-and-inorganic composite binder was impregnated into the base layer 1 and the friction-surface layer 2 in an amount of 30 parts by weight with respect to the whole first and second chartaceous substrates taken as 100 parts by weight.

The friction material of Example No. 13 was thus manufactured in the same manner as Example No. 12. The thickness of the base layer 1 was 0.9 mm. The thickness of the friction-surface layer 2 was 0.1 mm. The base layer 1 exhibited a Young's modulus Eb of 55 MPa. The entire friction material exhibited a Young's modulus Et of 130 MPa. Thus, the Eb/Et was 0.423 (i.e., Eb/Et=0.423).

The friction material of Example No. 13 was examined for the characteristics in the same manner as Example No. 1. The results of the measurements are summarized in Table 5.

EXAMPLE No. 14

Except that the composition ratio of the raw materials was different from that of Example No. 12, a friction material of Example No. 14 was manufactured in the same manner as Example No. 12.

For instance, the base layer 1 was composed of a first chartaceous substrate. The first chartaceous substrate included a cellulose fiber in an amount of 10 parts by weight and an aramid fiber in an amount of 80 parts by weight. Whilst, the friction-surface layer 2 was composed of a second chartaceous substrate. The second chartaceous substrate included a cellulose fiber in an amount of 10 parts by weight, an aramid fiber in an amount of 80 parts by weight, and zeolite in an amount of 200 parts by weight. Then, the organic-and-inorganic composite binder was impregnated into the base layer 1 and the friction-surface layer 2 in an amount of 30 parts by weight with respect to the whole first and second chartaceous substrates taken as 100 parts by weight.

The friction material of Example No. 14 was thus manufactured in the same manner as Example No. 12. The thickness of the base layer 1 was 0.9 mm. The thickness of the friction-surface layer 2 was 0.1 mm. The base layer 1 exhibited a Young's modulus Eb of 55 MPa. The entire friction material exhibited a Young's modulus Et of 135 MPa. Thus, the Eb/Et was 0.407 (i.e., Eb/Et=0.407).

The friction material of Example No. 14 was examined for the characteristics in the same manner as Example No. 1. The results of the measurements are summarized in Table 5.

EXAMPLE No. 15

In a friction material of Example No. 15, the base layer 1 was composed of a first chartaceous substrate. The first chartaceous substrate included a cellulose fiber in an amount of 80 parts by weight and an aramid fiber in an amount of 10 parts by weight.

Whilst, the friction-surface layer 2 was composed of a second chartaceous substrate. The second chartaceous substrate included a cellulose fiber in an amount of 80 parts by weight, an aramid fiber in an amount of 10 parts by weight, and a composite filler in an amount of 110 parts by weight. The composite filler included an aramid fiber in an amount of 10 parts by weight and zeolite in an amount of 100 parts by weight. Then, an organic-and-inorganic composite binder was impregnated into the base layer 1 and the friction-surface layer 2 in an amount of 27 parts by weight with respect to the whole first and second chartaceous substrates taken as 100 parts by weight.

The friction material of Example No. 15 was manufactured as hereinafter described.

A first water dispersion was prepared for the base layer 1. In the first water dispersion, 80 parts by weight of the cellulose fiber and 10 parts by weight of the aramid fiber were mixed. A second water dispersion was prepared for the friction-surface layer 2. In the second water dispersion, 10 parts by weight of the aramid fiber and 100 parts by weight of the zeolite were mixed. Note that the zeolite was identical with the one used in Example No. 12.

Then, a Fourdrinier machine was used. On the endless wire screen, the first water dispersion was flowed out to remove the water. Thus, a precursor base layer was formed. In the middle of the water removal, the second water dispersion was flowed out over the precursor base layer to remove the water. Consequently, a two-layered precursor chartaceous substrate, which included the precursor base layer and a precursor friction-surface layer, was prepared by using the papermaking machine.

Note that the thicknesses of the precursor base layer and the precursor friction-surface layer were controlled by adjusting the concentrations of the raw materials in the first and second water dispersions, respectively. Also note that, in the preparation using the papermaking machine, the aramid fiber entangled around the zeolite to form the composite filler.

The precursor chartaceous substrate, which was thus prepared by using the papermaking machine, was compressed with two rollers, and was dried by a drying roller to prepare a chartaceous substrate. Then, the chartaceous substrate was impregnated with the organic-and-inorganic composite binder in the same manner as Example No. 5. After drying and burning, the impregnated chartaceous substrate was cut to a predetermined shape. Thus, a friction material of Example No. 15 was completed.

The thickness of the base layer 1 was 0.9 mm. The thickness of the friction-surface layer 2 was 0.1 mm. The base layer 1 exhibited a Young's modulus Eb of 60 MPa. The entire friction material exhibited a Young's modulus Et of 140 MPa. Thus, the Eb/Et was 0.429 (i.e., Eb/Et=0.429).

The friction material of Example No. 15 was examined for the characteristics in the same manner as Example No. 1. The results of the measurements are summarized in Table 5.

EXAMPLE No. 16

Except that the composition ratio of the raw materials was different from that of Example No. 15, a friction material of Example No. 16 was manufactured in the same manner as Example No. 15.

For instance, the base layer 1 was composed of a first chartaceous substrate. The first chartaceous substrate included a cellulose fiber in an amount of 10 parts by weight and an aramid fiber in an amount of 80 parts by weight.

Whilst, the friction-surface layer 2 was composed of a second chartaceous substrate. The second chartaceous substrate included a cellulose fiber in an amount of 10 parts by weight, an aramid fiber in an amount of 80 parts by weight, and a composite filler in an amount of 110 parts by weight. The composite filler included an aramid fiber in an amount of 10 parts by weight and zeolite in an amount of 100 parts by weight. Then, the organic-and-inorganic composite binder was impregnated into the base layer 1 and the friction-surface layer 2 in an amount of 27 parts by weight with respect to the whole first and second chartaceous substrates taken as 100 parts by weight.

The friction material of Example No. 16 was thus manufactured in the same manner as Example No. 15. The thickness of the base layer 1 was 0.9 mm. The thickness of the friction-surface layer 2 was 0.1 mm. The base layer 1 exhibited a Young's modulus Eb of 55 MPa. The entire friction material exhibited a Young's modulus Et of 130 MPa. Thus, the Eb/Et was 0.423 (i.e., Eb/Et=0.423).

The friction material of Example No. 16 was examined for the characteristics in the same manner as Example No. 1. The results of the measurements are summarized in Table 5.

EXAMPLE No. 17

Except that the composition ratio of the raw materials was different from that of Example No. 15, a friction material of Example No. 17 was manufactured in the same manner as Example No. 15.

For instance, the base layer 1 was composed of a first chartaceous substrate. The first chartaceous substrate included a cellulose fiber in an amount of 10 parts by weight and an aramid fiber in an amount of 80 parts by weight.

Whilst, the friction-surface layer 2 was composed of a second chartaceous substrate. The second chartaceous substrate included a cellulose fiber in an amount of 10 parts by weight, an aramid fiber in an amount of 80 parts by weight, and a composite filler in an amount of 210 parts by weight. The composite filler included an aramid fiber in an amount of 10 parts by weight and zeolite in an amount of 200 parts by weight. Then, the organic-and-inorganic composite binder was impregnated into the base layer 1 and the friction-surface layer 2 in an amount of 27 parts by weight with respect to the whole first and second chartaceous substrates taken as 100 parts by weight.

The friction material of Example No. 17 was thus manufactured in the same manner as Example No. 15. The thickness of the base layer 1 was 0.9 mm. The thickness of the friction-surface layer 2 was 0.1 mm. The base layer 1 exhibited a Young's modulus Eb of 55 MPa. The entire friction material exhibited a Young's modulus Et of 135 MPa. Thus, the Eb/Et was 0.407 (i.e., Eb/Et=0.407).

The friction material of Example No. 17 was examined for the characteristics in the same manner as Example No. 1. The results of the measurements are summarized in Table 5.

Comparative Example No. 1

Except that the raw materials and the composition ratio thereof were different from those of Example No. 1, a friction material of Comparative Example No. 1 was manufactured in the same manner as Example No. 1.

For instance, the base layer 1 was composed of a first chartaceous substrate. The first chartaceous substrate included a cellulose fiber in an amount of 80 parts by weight, an aramid fiber in an amount of 10 parts by weight, and cashew dust in an amount of 10 parts by weight. Whilst, the friction-surface layer 2 was composed of a second chartaceous substrate. The second chartaceous substrate included a cellulose fiber in an amount of 80 parts by weight and an aramid fiber in an amount of 10 parts by weight. Then, a phenolic resin was impregnated into the base layer 1 and the friction-surface layer 2 in an amount of 30 parts by weight with respect to the whole first and second chartaceous substrates taken as 100 parts by weight.

The friction material of Comparative Example No. 1 was thus manufactured in the same manner as Example No. 1. The thickness of the base layer 1 was 0.9 mm. The thickness of the friction-surface layer 2 was 0.1 mm. The base layer 1 exhibited a Young's modulus Eb of 65 MPa. The entire friction material exhibited a Young's modulus Et of 60 MPa. Thus, the Eb/Et was 1.083 (i.e., Eb/Et=1.083).

The friction material of Comparative Example No. 1 was examined for the characteristics in the same manner as Example No. 1. The results of the measurements are summarized in Table 4 or 5, and are illustrated in FIG. 2.

Comparative Example No. 2

A friction material of Comparative Example No. 2 had a uniform composition entirely, and was composed of a single chartaceous substrate. The single chartaceous substrate included a cellulose fiber in an amount of 80% by weight, an aramid fiber in an amount of 10% by weight, and cashew dust in an amount of 10% by weight. Then, a phenolic resin was impregnated into the single chartaceous substrate in an amount of 30 parts by weight with respect to the single chartaceous substrate taken as 100 parts by weight. Note that the friction material had a thickness of 1 mm and exhibited a Young's modulus of 120 MPa.

The friction material of Comparative Example No. 2 was examined for the characteristics in the same manner as Example No. 1. The results of the measurements are summarized in Table 4 or 5, and are illustrated in FIG. 2.

Comparative Example No. 3

A friction material of Comparative Example No. 3 had a uniform composition entirely, and was composed of a single chartaceous substrate. The single chartaceous substrate included a cellulose fiber in an amount of 55% by weight, an aramid fiber in an amount of 5% by weight, and cashew dust in an amount of 40% by weight. Then, a phenolic resin was impregnated into the single chartaceous substrate in an amount of 30 parts by weight with respect to the single chartaceous substrate taken as 100 parts by weight. Note that the friction material had a thickness of 1 mm and exhibited a Young's modulus of 120 MPa.

The friction material of Comparative Example No. 3 was examined for the characteristics in the same manner as Example No. 1. The results of the measurements are summarized in Table 4 or 5, and are illustrated in FIG. 2.

TABLE 4

| | | | #1 Example | #2 | #3 | #4 | #5 | #6 | #7 | #8 | #9 | #10 | #11 |
|---|---|---|---|---|---|---|---|---|---|---|---|---|---|
| *1 | Silicate Glass Fiber | | — | — | — | 80 | — | — | — | — | — | — | — |
| | Cellulose Fiber | | 80 | 10 | 10 | — | 80 | 10 | 10 | 80 | 80 | 10 | 10 |
| | Aramid Fiber | | 10 | 80 | 80 | — | 10 | 80 | 80 | 10 | 10 | 80 | 80 |
| | Cashew Dust | | — | — | — | — | — | — | — | — | — | — | — |
| *2 | Silicate Glass Fiber | | — | — | — | 80 | — | — | — | — | — | — | — |
| | Cellulose Fiber | | 80 | 10 | 10 | — | 80 | 10 | 10 | 80 | 80 | 10 | 10 |
| | Aramid Fiber | | 10 | 80 | 80 | — | 10 | 80 | 80 | 10 | 10 | 80 | 80 |
| | Cashew Dust | | 100 | 100 | 200 | 100 | 100 | 100 | 200 | 100 | — | — | — |
| | Composite | Aramid F. | — | — | — | — | — | — | — | — | 10 | 10 | 10 |
| | Filler | Cashew D. | — | — | — | — | — | — | — | — | 100 | 100 | 200 |
| Binder | Phenolic Resin | | 30 | 30 | 30 | 30 | — | — | — | — | — | — | — |
| | Composite Binder | | — | — | — | — | 30 | 30 | 30 | 30 | 27 | 27 | 27 |
| *3 | Base Layer: Eb | | 50 | 45 | 45 | 40 | 60 | 55 | 55 | 120 | 60 | 55 | 55 |
| | Total: Et | | 75 | 73 | 85 | 83 | 160 | 155 | 175 | 150 | 155 | 150 | 170 |
| | Eb/Et | | 0.667 | 0.616 | 0.529 | 0.482 | 0.375 | 0.355 | 0.314 | 0.800 | 0.387 | 0.367 | 0.324 |
| | μ-V Gradient | | 1.00 | 1.10 | 1.05 | 1.10 | 1.08 | 1.15 | 1.13 | 1.05 | 1.05 | 1.13 | 1.10 |
| | Static Fric. Coeffi. | | 0.200 | 0.190 | 0.200 | 0.195 | 0.250 | 0.240 | 0.250 | 0.140 | 0.250 | 0.240 | 0.245 |
| | Durability (Cycles) | | 2000/P | 2000/P | 2000/P | 2000/P | 2000/P | 2000/P | 2000/P | 1500/B | 3000/P | 3000/P | 3000/P |

| | | | Comp. Example | | |
|---|---|---|---|---|---|
| | | | #1 | #2 | #3 |
| *1 | Silicate Glass Fiber | | — | — | — *4 |
| | Cellulose Fiber | | 80 | 80 | 55 |
| | Aramid Fiber | | 10 | 10 | 5 |
| | Cashew Dust | | 10 | 100 | 40 |
| *2 | Silicate Glass Fiber | | — | — | — |
| | Cellulose Fiber | | 80 | 80 | 55 |
| | Aramid Fiber | | 10 | 10 | 5 |
| | Cashew Dust | | — | 100 | 40 |
| | Composite | Aramid F. | — | — | — |
| | Filler | Cashew D. | — | — | — |
| Binder | Phenolic Resin | | 30 | 30 | 30 |
| | Composite Binder | | — | — | — |
| *3 | Base Layer: Eb | | 65 | — | — |
| | Total: Et | | 60 | — | — |
| | Eb/Et | | 1.083 | — | — |
| | μ-V Gradient | | 0.89 | 0.80 | 0.95 |
| | Static Fric. Coeffi. | | 0.130 | 0.145 | 0.145 |
| | Durability (Cycles) | | 1500/B | 2000/P | 1500/B |

Note:
*1 denotes the base layer
*2 denotes the friction-surface layer.
*3 denotes the characteristics.
*4 denotes the chartaceous substrate.
200/P or 3000/P denotes that the friction materials successfully passed 2,000 cycles or 3,000 cycles.
1500/B denotes that the friction materials broke at 1,500 cycles.

TABLE 5

| | | | Example | | | | | | Comp. Example | | |
|---|---|---|---|---|---|---|---|---|---|---|---|
| | | | #12 | #13 | #14 | #15 | #16 | #17 | #1 | #2 | #3 |
| *1 | Silicate Glass Fiber | | — | — | — | — | — | — | — | — | — *4 |
| | Cellulose Fiber | | 80 | 10 | 10 | 80 | 10 | 10 | 80 | 80 | 55 |
| | Aramid Fiber | | 10 | 80 | 80 | 10 | 80 | 80 | 10 | 10 | 5 |
| | Cashew Dust | | — | — | — | — | — | — | 10 | 100 | 40 |
| *2 | Silicate Glass Fiber | | — | — | — | — | — | — | — | — | — |
| | Cellulose Fiber | | 80 | 10 | 10 | 80 | 10 | 10 | 80 | 80 | 55 |
| | Aramid Fiber | | 10 | 80 | 80 | 10 | 80 | 80 | 10 | 10 | 5 |
| | Zeolite | | 100 | 100 | 200 | — | — | — | — | 100 | 40 |
| | Composite | Aramid F. | — | — | — | 10 | 10 | 10 | — | — | — |
| | Filler | Zeolite | — | — | — | 100 | 100 | 200 | — | — | — |
| Binder | Phenolic Resin | | — | — | — | — | — | — | 30 | 30 | 30 |
| | Composite Binder | | 30 | 30 | 30 | 27 | 27 | 27 | — | — | — |
| *3 | Base Layer: Eb | | 60 | 55 | 55 | 60 | 55 | 55 | 65 | — | — |
| | Total: Et | | 140 | 130 | 135 | 140 | 130 | 135 | 60 | — | — |
| | Eb/Et | | 0.429 | 0.423 | 0.407 | 0.429 | 0.423 | 0.407 | 1.083 | — | — |
| | μ-V Gradient | | 1.10 | 1.13 | 1.11 | 1.08 | 1.10 | 1.09 | 0.89 | 0.80 | 0.95 |

TABLE 5-continued

|  | Example | | | | | | Comp. Example | | |
| --- | --- | --- | --- | --- | --- | --- | --- | --- | --- |
|  | #12 | #13 | #14 | #15 | #16 | #17 | #1 | #2 | #3 |
| Static Fric. Coeffi. | 0.200 | 0.195 | 0.205 | 0.195 | 0.195 | 0.200 | 0.130 | 0.145 | 0.145 |
| Durability (Cycles) | 2000/P | 2000/P | 2000/P | 3000/P | 3000/P | 3000/P | 1500/B | 2000/P | 1500/B |

Note:
*1 denotes the base layer.
*2 denotes the friction-surface layer.
*3 denotes the characteristics.
*4 denotes the chartaceous substrate.
2000/P or 3000/P denotes that the friction materials successfully passed 2,000 cycles or 3,000 cycles.
1500/B denotes that the friction materials broke at 1,500 cycles.

(Evaluation)

It is understood from FIG. 2 that the $\mu$-V gradient was 1.0 or less when the Eb/Et exceeded 0.7. Thus, it is appreciated that the Eb/Et can preferably be 0.7 or less. In the friction materials of Comparative Example Nos. 1 through 3, they exhibited the $\mu$-V gradient of 1.0 or less so that they had the negative-gradient friction characteristics unpreferably.

In particular, since Comparative Example No. 1 included the filler in the base layer only, it exhibited Eb/Et >1. As a result, Comparative Example No. 1 exhibited the low friction coefficient and the small $\mu$-V gradient, and had the reduced durability. Moreover, since Comparative Example Nos. 2 and 3 had the uniform compositions entirely, they exhibited the small $\mu$-V gradients and the low friction coefficient.

Whereas, Example Nos. 1 and 12 exhibited the high friction coefficient and the $\mu$-V gradient of 1 or more, and were good in terms of the durability. It is apparent this benefits resulted from the arrangement that the cashew dust or the zeolite was included in the friction-surface layer only so that the relationship, Eb/Et<1, was established.

Comparing Example No. 1 with Example No. 5, it is understood the Eb/Et was decreased by using the organic-and-inorganic composite binder in place of the phenolic resin, and that the friction coefficient was further increased. Comparing Example No. 5 with Example No. 9, and comparing Example No. 12 and Example No. 15, it is apparent that the durability was furthermore upgraded when the composite filler, in which the fibrous material was entangled around the filler powder, was used.

Moreover, it is appreciated that the evaluation results, which were similar to those mentioned above, could be obtained by comparing Example No. 2 with Example Nos. 6 and 10, by comparing Example No. 3 with Example Nos. 7 and 11, by comparing Example No. 13 and Example No. 16, and by comparing Example No. 14 and Example No. 17.

Example No. 8 differed from Example No. 9 in that the cashew dust was included in the base layer but the cashew dust included in the friction-surface layer was not made into the composite filler. Note that Example No. 8 was inferior to Example No. 9 in terms of the durability. This is believed to have resulted from the fact that the cashew dust, which was not entangled by the fibrous material, scattered because of the high concentration of the filler. For instance, due to the similar reason, Comparative Example No. 3, which contained the cashew dust in the high concentration, was deteriorated sharply in terms of the durability.

Except that the oil temperature was increased to 120° C., the friction materials of Example Nos. 3 and 14 were further subjected to an extra test by using an SAE #2 wear tester under the same conditions as set forth in Table 1 above. In this extra test, the variations of the friction coefficients were measured when the sliding speeds were varied. The results are illustrated in FIG. 3.

Figure 3:
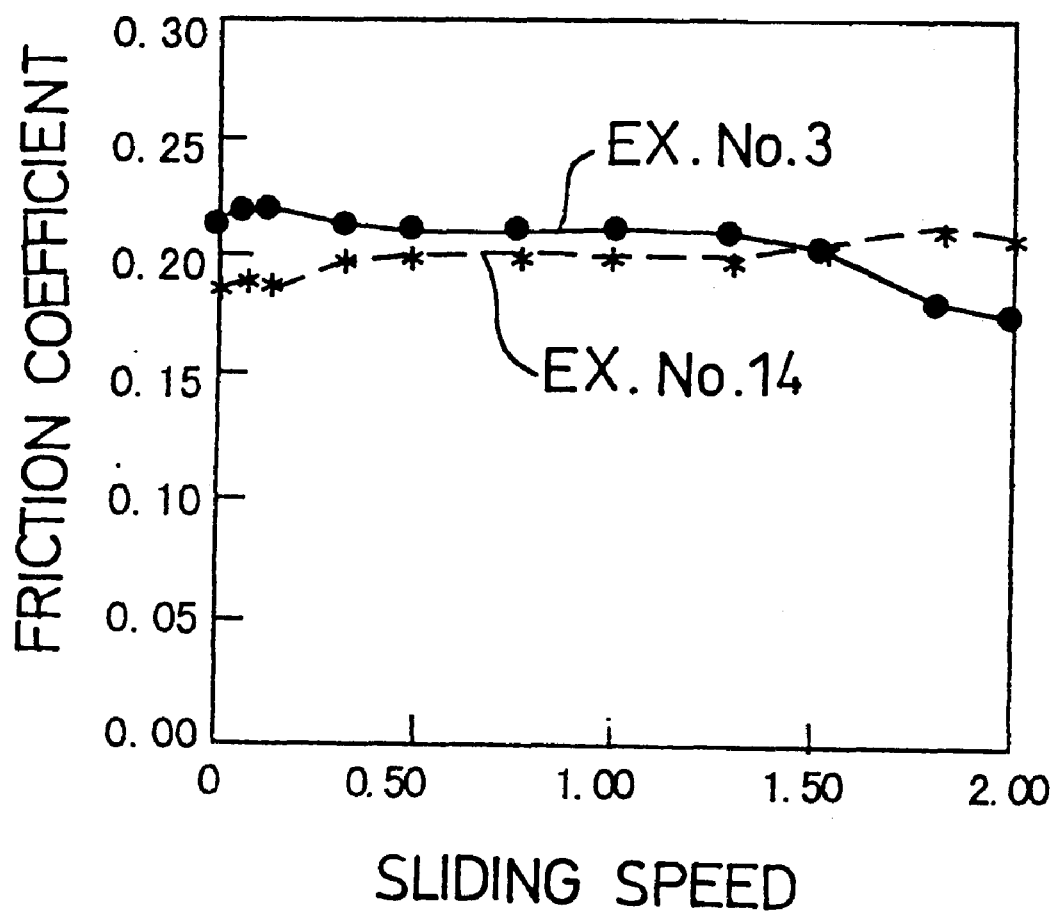
FIG. 3 is a graph for illustrating the relationship between the sliding speed and the friction coefficient.

It is understood from FIG. 3 that the friction material of Example No. 3 exhibited the decreased friction coefficient when the sliding speed was increased. Whereas, the friction material of Example No. 14 was extremely stable in terms of the friction coefficient. Namely, as the filler, the zeolite stabilized the friction coefficient more than the cashew dust. This is believed to occur in the following manner:the lubricant is adsorbed in the inherent pores in the zeolite so that the viscosity raises the shearing resistance between the friction material and the mating member even at the high sliding speed.

EXAMPLE No. 18

In a friction material of Example No. 18, the base layer 1 was composed of a first chartaceous substrate. The first chartaceous substrate included a cellulose fiber in an amount of 10 parts by weight and an aramid fiber in an amount of 80 parts by weight.

Whilst, the friction-surface layer 2 was composed of a second chartaceous substrate. The second chartaceous substrate included a cellulose fiber in an amount of 10 parts by weight, an aramid fiber in an amount of 80 parts by weight, and a composite filler in an amount of 210 parts by weight. The composite filler included an aramid fiber in an amount of 10 parts by weight and diatomaceous earth in an amount of 200 parts by weight. Then, an organic-and-inorganic composite binder was impregnated into the base layer 1 and the friction-surface layer 2 in an amount of 27 parts by weight with respect to the whole first and second chartaceous substrates taken as 100 parts by weight.

The friction material of Example No. 18 was manufactured as hereinafter described.

A first water dispersion was prepared for the base layer 1. In the first water dispersion, 10 parts by weight of the cellulose fiber and 80 parts by weight of the aramid fiber were mixed. A second water dispersion was prepared for the friction-surface layer 2. In the second water dispersion, 10 parts by weight of the aramid fiber and 200 parts by weight of the diatomaceous earth were mixed.

Then, a Fourdrinier machine was used. On the endless wire screen, the first water dispersion was flowed out to remove the water. Thus, a precursor base layer was formed. In the middle of the water removal, the second water dispersion was flowed out over the precursor base layer to remove the water. Consequently, a two-layered precursor chartaceous substrate, which included the precursor base layer and a precursor friction-surface layer, was prepared by using the papermaking machine.

Note that the thicknesses of the precursor base layer and the precursor friction-surface layer were controlled by adjusting the concentrations of the raw materials in the first and second water dispersions, respectively. Also note that, in the preparation using the papermaking machine, the aramid fiber entangled around the diatomaceous earth to form the composite filler.

The precursor chartaceous substrate, which was thus prepared by using the papermaking machine, was compressed with two rollers, and was dried by a drying roller to prepare a chartaceous substrate. Then, the chartaceous substrate was impregnated with the organic-and-inorganic composite binder in the same manner as Example No. 5. After drying and burning, the impregnated chartaceous substrate was cut to a predetermined shape. Thus, a friction material of Example No. 18 was completed.

The thickness of the base layer 1 was 0.9 mm. The thickness of the friction-surface layer 2 was 0.1 mm. The base layer 1 exhibited a Young's modulus Eb of 60 MPa. The entire friction material exhibited a Young's modulus Et of 145 MPa. Thus, the Eb/Et was 0.414 (i.e., Eb/Et=0.414).

The friction material of Example No. 18 was examined for the characteristics in the same manner as Example No. 1. The results of the measurements are summarized in Table 6.

Comparative Example No. 4

Except that a phenolic resin was used instead of the composite binder, a friction material of Comparative Example No. 4 was manufactured in the same manner as Example No. 18.

The thickness of the base layer 1 was 0.9 mm. The thickness of the friction-surface layer 2 was 0.1 mm. The base layer 1 exhibited a Young's modulus Eb of 60 MPa. The entire friction material exhibited a Young's modulus Et of 140 MPa. Thus, the Eb/Et was 0.429 (i.e., Eb/Et=0.429).

The friction material of Comparative Example No. 4 was examined for the characteristics in the same manner as Example No. 1. The results of the measurements are summarized in Table 6.

TABLE 6

| | | | Ex. #18 | C. Ex. #4 | |
|---|---|---|---|---|---|
| Base | Cellulose Fiber | | 10 | 10 | *2 |
| Layer | Aramid Fiber | | 80 | 80 | |
| Friction-Surface Layer | Cellulose Fiber | | 10 | 10 | |
| | Aramid Fiber | | 80 | 80 | |
| | Composite | Aramid F. | 10 | 10 | |
| | Binder | *1 | 200 | 200 | |
| Binder | Phenolic Resin | | — | 27 | |
| | Composit Binder | | 27 | — | |
| Characteristics | Base Layer: Eb | | 60 | 60 | |
| | Total: Et | | 145 | 140 | |
| | Eb/Et | | 0.414 | 0.429 | |
| | μ-V Gradient | | 1.10 | 0.87 | |
| | Static Fric. Coeffi. | | 0.170 | 0.145 | |
| | Durability (Cycles) | | 3000/P | 1500/P | |

Note:
*1 denotes diatomaceous earth.
*2 denotes the chartaceous substrate.
2000/P denotes that the friction material successfully passed 3,000 cycles.
1500/B denotes that the friction material broke at 1,500 cycles.

(Evaluation)

As set forth in Table 6, the friction material of Comparative Example No. 4 exhibited the μ-V gradient of less than 1. Accordingly, Comparative Example No. 4 was poor in terms of the friction coefficient and the durability. However, the friction material of Example No. 18 exhibited the μ-V gradient of 1 or more. Consequently, Example No. 18 exhibited the high friction coefficient, and was superior to Comparative Example No. 4 in terms of the durability. For instance, the benefits resulting from the inclusion of the diatomaceous earth were not effected when the phenolic-resin binder was used. However, the benefits resulting therefrom were effected at last when the composite binder was used.

EXAMPLE No. 19

In a friction material of Example No. 19, the base layer 1 was composed of a first chartaceous substrate. The first chartaceous substrate included a cellulose fiber in an amount of 10 parts by weight and an aramid fiber in an amount of 80 parts by weight.

Whilst, the friction-surface layer 2 was composed of a second chartaceous substrate. The second chartaceous substrate included a cellulose fiber in an amount of 10 parts by weight, an aramid fiber in an amount of 80 parts by weight, and a composite filler in an amount of 210 parts by weight. The composite filler included an aramid fiber in an amount of 10 parts by weight and graphite in an amount of 200 parts by weight. Then, an organic-and-inorganic composite binder was impregnated into the base layer 1 and the friction-surface layer 2 in an amount of 27 parts by weight with respect to the whole first and second chartaceous substrates taken as 100 parts by weight.

The friction material of Example No. 19 was manufactured as hereinafter described.

A first water dispersion was prepared for the base layer 1. In the first water dispersion, 10 parts by weight of the cellulose fiber and 80 parts by weight of the aramid fiber were mixed. A second water dispersion was prepared for the friction-surface layer 2. In the second water dispersion, 10 parts by weight of the aramid fiber and 200 parts by weight of the graphite powder were mixed.

Then, a Fourdrinier machine was used. On the endless wire screen, the first water dispersion was flowed out to remove the water. Thus, a precursor base layer was formed. In the middle of the water removal, the second water dispersion was flowed out over the precursor base layer to remove the water. Consequently, a two-layered precursor chartaceous substrate, which included the precursor base layer and a precursor friction-surface layer, was prepared by using the papermaking machine.

Note that the thicknesses of the precursor base layer and the precursor friction-surface layer were controlled by adjusting the concentrations of the raw materials in the first and second water dispersions, respectively. Also note that, in the preparation using the papermaking machine, the aramid fiber entangled around the graphite powder to form the composite filler.

The precursor chartaceous substrate, which was thus prepared by using the papermaking machine, was compressed with two rollers, and was dried by a drying roller to prepare a chartaceous substrate. Then, the chartaceous substrate was impregnated with the organic-and-inorganic composite binder in the same manner as Example No. 5. After drying and burning, the impregnated chartaceous substrate was cut to a predetermined shape. Thus, a friction material of Example No. 19 was completed.

The thickness of the base layer 1 was 0.9 mm. The thickness of the friction-surface layer 2 was 0.1 mm. The base layer 1 exhibited a Young's modulus Eb of 55 MPa. The entire friction material exhibited a Young's modulus Et of 130 MPa. Thus, the Eb/Et was 0.423 (i.e., Eb/Et=0.423).

The friction material of Example No. 19 was examined for the characteristics in the same manner as Example No.

1. The results of the measurements are summarized in Table 7. Moreover, regarding the durability, an extra durability test was carried out by increasing the number of revolutions of an SAE #2 wear tester (See Table 2.) to 7,000 rpm.

In addition, for the purpose of comparison, the friction material of Example No. 11 was subjected to the series of the examinations in the same manner as Example No. 19. The results of the measurements are also summarized in Table 7.

Comparative Example No. 5

Except that a phenolic resin was used instead of the composite binder, a friction material of Comparative Example No. 5 was manufactured in the same manner as Example No. 19.

The thickness of the base layer 1 was 0.9 mm. The thickness of the friction-surface layer 2 was 0.1 mm. The base layer 1 exhibited a Young's modulus Eb of 60 MPa. The entire friction material exhibited a Young's modulus Et of 65 MPa. Thus, the Eb/Et was 0.923 (i.e., Eb/Et=0.923).

The friction material of Comparative Example No. 5 was examined for the characteristics in the same manner as Example No. 19. The results of the measurements are summarized in Table 7.

TABLE 7

|  |  |  | Ex. #19 | C. Ex. #5 | Ex. #11 |
|---|---|---|---|---|---|
| Base | Cellulose Fiber |  | 10 | 10 | 10 *3 |
| Layer | Aramid Fiber |  | 80 | 80 | 80 |
| Fric- | Cellulose Fiber |  | 10 | 10 | 10 |
| tion- | Aramid Fiber |  | 80 | 80 | 80 |
| Surface | Composite | Aramid F. | 10 | 10 | 10 |
| Layer | Filler | Graphite | 200 | 200 | — |
|  |  | Cashew Dust | — | — | 200 |
| Binder | Phenolic Resin |  | — | 27 | — |
|  | Composite Binder |  | 27 | — | 27 |
| Char- | Base Layer: Eb |  | 55 | 60 | 55 |
| acter- | Eb/Et |  | 130 | 65 | 170 |
| istics | $\mu$-V Gradient |  | 1.10 | 0.90 | 1.10 |
|  | Static Fric. Coeffi. |  | 0.200 | 0.11 | 0.245 |
|  | Durability (Cycles) *1 |  | 3000/P | 1500/B | 3000/P |
|  | Durbaility (Cycles) *2 |  | 5000/P | — | 3000/B |

Note:
*1 was tested at 6,000 rpm.
*2 was tested at 7,000 rpm.
*3 denotes the chartaceous substrate.
3000/P or 5000/P denotes that the friction materials successfully passed 3,000 cycles or 5,000 cycles.
1500/B or 3000/B denotes that the friction materials broke at 1,500 cycles or 3,000 cycles.

(Evaluation)

As set forth in Table 7, the friction material of Comparative Example No. 5 exhibited the $\mu$-V gradient of less than 1. Accordingly, Comparative Example No. 5 was poor in terms of the friction coefficient and the durability. However, the friction material of Example No. 19 exhibited the $\mu$-V gradient of 1 or more. Consequently, Example No. 19 exhibited the high friction coefficient, and was superior to Example No. 11 in terms of the durability.

For instance, the benefits resulting from the inclusion of the graphite were not effected when the phenolic-resin binder was used. However, the benefits resulting therefrom were effected at last when the composite binder was used. In particular, the friction material of Example No. 19, in which the graphite and the composite binder were used, was upgraded more in terms of the durability than the friction material of Example 11, in which the cashew dust and the composite binder were used.

Since the durability of the friction material can be upgraded by simultaneously using the graphite and the composite binder, it is obvious that a friction material exhibiting a high friction coefficient and a good heat resistance can be prepared by simultaneously applying the graphite and the organic-and-inorganic composite binder not only to the two-layered friction material according to the present invention but also to a single-layered friction material.

Having now fully described the present invention, it will be apparent to one of ordinary skill in the art that many changes and modifications can be made thereto without departing from the spirit or scope of the present invention as set forth herein including the appended claims.

What is claimed is:

1. A wet type friction material of a layered construction comprising:

a core plate; and at least two layers laminated to each other, one of the two layers being a base layer disposed on said core plate, the other one thereof being a friction-surface layer disposed on said base layer, wherein said base layer and said friction-surface layer each comprises a fibrous material and a binder, wherein the entire friction material exhibiting a Young's modulus of Et, said base layer exhibiting a Young's modulus of Eb, and Et and Eb satisfying a relationship of Eb/Et <1.

2. The wet type friction material according to claim 1, wherein each of said friction-surface layer and said base layer includes an organic-and-inorganic composite binder which is prepared by burning a sol solution, the sol solution being prepared by hydrolyzing at least one member selected from the group consisting of a metallic alkoxide and a metallic alkoxide substituted by an organic group.

3. The wet type friction material according to claim 1, wherein said friction-surface layer includes a composite filler which is made by entangling a fibrous material around a filler powder.

4. The wet type friction material according to claim 1, wherein said friction-surface layer includes a porous filler which is composed of a porous inorganic compound.

5. The wet type friction material according to claim 1, wherein said friction-surface layer includes a composite filler which is made by entangling a fibrous material around a porous filler powder being composed of a porous inorganic compound.

6. The wet type friction material according to claim 2, wherein said friction-surface layer includes diatomaceous earth.

7. The wet type friction material according to claim 2, wherein said friction-surface layer includes graphite.

8. The wet type friction material according to claim 2, wherein said organic-and-inorganic composite binder is included in an amount 0 to 70% by weight with respect to the entire friction material.

9. The wet type friction material according to claim 3, wherein said composite filler is included in said friction-surface layer in an amount of 30 to 90% by weight.

10. The wet type friction material according to claim 4, wherein said porous filler is included in said friction-surface layer in an amount of 30 to 90% by weight.

11. The wet type friction material according to claim 5, wherein said composite filler is included in said friction-surface layer in an amount of 30 to 90% by weight.

12. The wet type friction material according to claim 6, wherein said diatomaceous earth is included in said friction-surface layer in an amount of 30 to 90% by weight.

13. The wet type friction material according to claim 7, wherein said graphite is included in said friction-surface layer in an amount of 30 to 90% by weight.

14. The wet type friction material according to claim 1, wherein a ratio of thickness of said friction-surface layer with respect to an entire thickness of the entire friction material is 0.1 or less.

* * * * *